United States Patent
Matsuura et al.

[11] Patent Number: 6,044,795
[45] Date of Patent: Apr. 4, 2000

[54] AUTOMATIC FEEDING SYSTEM HAVING ANIMAL CARRIED TRANSMITTER WHICH TRANSMITS FEEDING INSTRUCTIONS TO FEEDER

[75] Inventors: Taketoshi Matsuura, Takatsuki; Eiji Fujii, Ibaraki; Kazuhiro Mori, Katano, all of Japan

[73] Assignee: Matsushita Electronics Corporation, Osaka, Japan

[21] Appl. No.: 09/107,345

[22] Filed: Jun. 30, 1998

[30] Foreign Application Priority Data

Jul. 1, 1997 [JP] Japan .................................. 9-175422

[51] Int. Cl.[7] .............................. A01K 1/10; A01K 5/00; A01K 39/00; H04B 1/02
[52] U.S. Cl. .................... 119/51.02; 367/139; 119/51.12; 119/53
[58] Field of Search .................................. 119/52.1, 51.11, 119/51.12, 53, 53.5, 54, 51.02; 342/40–51; 367/139

[56] References Cited

U.S. PATENT DOCUMENTS

| | | | |
|---|---|---|---|
| 3,557,758 | 1/1971 | Lack | 119/51 |
| 4,129,855 | 12/1978 | Rodrian | 340/152 T |
| 4,173,016 | 10/1979 | Dickson | 343/6.8 R |
| 4,262,632 | 4/1981 | Hanton et al. | 119/1 |
| 4,631,708 | 12/1986 | Wood et al. | 367/2 |
| 4,663,625 | 5/1987 | Yewen | 340/825.54 |
| 4,992,794 | 2/1991 | Brouwers | 342/51 |
| 5,105,763 | 4/1992 | Poiesz et al. | 119/51.02 |
| 5,211,129 | 5/1993 | Taylor et al. | 119/3 |
| 5,252,962 | 10/1993 | Urbas et al. | 340/870.17 |
| 5,332,034 | 7/1994 | Willham et al. | 119/174 |
| 5,372,133 | 12/1994 | Esch | 128/631 |
| 5,433,171 | 7/1995 | Ewell | 119/51.5 |
| 5,548,291 | 8/1996 | Meier et al. | 342/51 |
| 5,604,485 | 2/1997 | Lauro et al. | 340/572 |
| 5,614,890 | 3/1997 | Fox | 340/825.34 |
| 5,669,328 | 9/1997 | Lanfranchi | 119/57.92 |
| 5,673,647 | 10/1997 | Pratt | 119/51.02 |
| 5,699,066 | 12/1997 | Marsh et al. | 342/44 |
| 5,724,030 | 3/1998 | Urbas et al. | 340/870.17 |
| 5,826,538 | 10/1998 | Roybal | 119/51.12 |
| 5,833,603 | 11/1998 | Kovacs et al. | 600/317 |

FOREIGN PATENT DOCUMENTS

| | | | |
|---|---|---|---|
| 2522906 | 9/1983 | France | 119/51.02 |
| 7-95833 | 4/1995 | Japan . | |
| 7606727 | 12/1977 | Netherlands | 119/51.02 |
| 1273345 | 5/1970 | United Kingdom | 119/51.02 |
| 1577023 | 10/1980 | United Kingdom | 119/51.02 |
| 2120917 | 12/1983 | United Kingdom | 119/51.02 |
| WO84/01688 | 5/1984 | WIPO | 119/51.02 |
| WO87/04900 | 8/1987 | WIPO | 119/51.02 |

OTHER PUBLICATIONS

Electronics, Research and Development, Optical device to contact dolphins, pp. 46 and 48, Nov. 1963.

Primary Examiner—Michael J. Carone
Assistant Examiner—Fredrick T. French, III
Attorney, Agent, or Firm—Ratner & Prestia

[57] ABSTRACT

An automatic feeding system includes a tag attached to a body of a pet; and an automatic feeding apparatus for automatically feeding the pet. The tag includes a receiving device for receiving an electromagnetic wave from the automatic feeding apparatus; an information memory device storing information on the feeding of the pet and outputting the information in response to an output from the receiving device; and a sending device for sending the information which is output from the information memory device to the automatic feeding apparatus using an electric wave. The automatic feeding apparatus includes a receiving device for receiving the electric wave from the tag; an information reading device for reading the information on the feeding of the pet in response to an output from the receiving device of the automatic feeding apparatus; a feeding device for supplying feed based on the information; and a sending device for sending an instruction to read the information on the feeding of the pet to the tag using an electric wave.

13 Claims, 2 Drawing Sheets

AUTOMATIC FEEDING SYSTEM HAVING ANIMAL CARRIED TRANSMITTER WHICH TRANSMITS FEEDING INSTRUCTIONS TO FEEDER

BACKGROUND OF THE INVENTION

1. Field of the Invention:

The present invention relates to an automatic feeding system for automatically feeding a pet at an optimum time and in an optimum amount after confirming the presence of the pet.

2. Description of the Related Art:

Conventionally, a pet is fed by an owner of the pet directly or using an automatic feeding device at predetermined times.

In the case where the pet is fed directly by the owner, the owner cannot be absent for a long time for a trip or the like unless the owner takes the pet with him or her, or has somebody else feed the pet.

In the case where an automatic feeding device for automatically feeding the pet at prescribed times is used, feed is inconveniently supplied even when the pet is not present.

For example, a cat is not always near the feeding site because the cats are not usually kept in the house and are sometimes away from home for a number of days due to habit. When feed is supplied despite the absence of the pet, the feed is rotten giving undesirable appearance and smell, or newly supplied feed is on top of the rotten feed discouraging the pet from eating the newly supplied feed.

SUMMARY OF THE INVENTION

An automatic feeding system according to the present invention includes a tag attached to a body of a pet; and an automatic feeding apparatus for automatically feeding the pet. The tag includes a receiving device for receiving an electromagnetic wave from the automatic feeding apparatus; an information memory device for storing information on the feeding of the pet and outputting the information in response to an output from the receiving device; and a sending device for sending the information which is output from the information memory device, to the automatic feeding apparatus using an electromagnetic wave. The automatic feeding apparatus includes a receiving device for receiving the electromagnetic wave from the tag; an information reading device for reading the information on the feeding of the pet in response to an output from the receiving device of the automatic feeding apparatus; a feeding device for supplying feed based on the information; and a sending device for sending an instruction to read the information on the feeding of the pet to the tag using an electromagnetic wave.

In one embodiment of the invention, the sending device of the automatic feeding apparatus sends the instruction to the tag periodically until the presence of the pet is confirmed.

In one embodiment of the invention, the automatic feeding apparatus further includes a feeding memory device for storing information on a history of feeding times.

In one embodiment of the invention, the information on the feeding of the pet includes information on an amount of feed to be given to the pet and the times to feed the pet.

In one embodiment of the invention, the tag is attached to the pet by implantation into the body of the pet.

In one embodiment of the invention, the tag is attached to the pet by attachment to a collar worn by the pet.

According to the present invention, the automatic feeding apparatus accesses the tag through an electric wave and obtains information from the information memory device of the tag. By such a system, the automatic feeding apparatus feeds the pet under optimum conditions. Since the feed is supplied to the feed tray after confirming the presence of the pet, the feed is prevented from becoming rotten.

The automatic feeding apparatus checks the presence of the pet periodically. Accordingly, even when the pet is not present near the feeding site at the prescribed feeding time, the pet need not wait for food for a long time.

By referring to the history of feeding time stored in the automatic feeding apparatus, the next feeding time is optimized. The automatic feeding apparatus can optimally control the amount of feed.

Thus, the invention described herein makes possible the advantage of providing an automatic feeding system for automatically feeding a pet at prescribed time after confirming the presence of the pet.

This and other advantages of the present invention will become apparent to those skilled in the art upon reading and understanding the following detailed description with reference to the accompanying figures.

DESCRIPTION OF THE PREFERRED EMBODIMENTS

The present invention will be described by way of illustrative but not limiting examples with reference to the accompanying drawings.

Example 1

Figure 1:
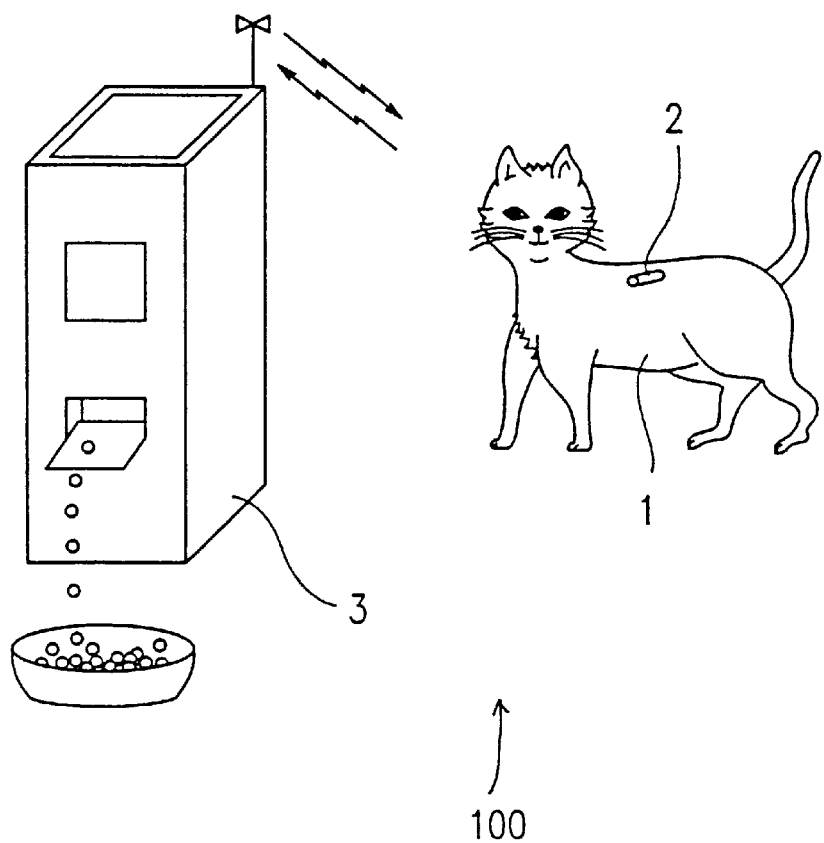
FIG. 1 is a schematic view of an automatic feeding system in a first example according to the present invention.

FIG. 1 schematically shows an automatic feeding system 100 in a first example according to the present invention. The automatic feeding system 100 includes a tag 2 and an automatic feeding apparatus 3 for automatically feeding a pet 1 based on information received from the tag 2. The tag 2 is attached to the pet 1. For example, attachment of the tag 2 can be accomplished via attachment to a collar worn by the pet 1 or by implantation into the body of the pet 1 as further described below. Specifically, the tag 2 is accommodated in a compact capsule having a diameter of about 0.5 mm to about 1 mm and a length of about 3 mm to about 10 mm. The capsule is implanted in a surface area (e.g., a skin area) of the body of the pet 1 so as to avoid, as much as possible, injuring or causing discomfort to the pet 1, or attached to a collar worn by the pet.

Figure 2:
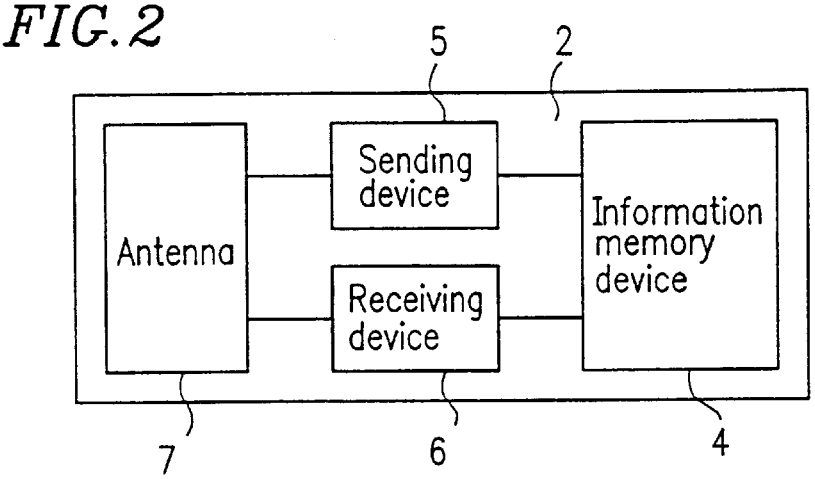
FIG. 2 is a block diagram showing a structure of a non-contact tag in the automatic feeding system shown in FIG. 1.

FIG. 2 is a block diagram showing a structure of the tag 2.

The tag 2 includes an information memory device 4, a sending device 5, a receiving device 6, and a coil-shaped antenna 7 connected to the sending device 5 and the receiving device 6 used for sending and receiving electromagnetic waves.

The information memory device 4, the sending device 5, and the receiving device 6 are accommodated in a compact semiconductor chip (not shown).

The information memory device 4 has information on the feeding of the pet 1 (FIG. 1) stored therein, including at least the amount of the feed to be given to the pet 1 and time to feed the pet 1. The information memory device 4 can also contain additional information other than regarding the feed of the pet 1, such as the type, size, age and habits of the pet 1, as well as the amount of the total feed to be given per day. The information memory device 4 includes, for example, a ferroelectric memory.

The receiving device 6 receives an electromagnetic wave sent from the automatic feeding apparatus 3 through the antenna 7. Then, the receiving device 6 generates a voltage in response to the electromagnetic wave. The information memory device 4, and the sending device 5 and the receiving device 6 are supplied with power. The tag 2 starts operating by the supplied power. The receiving device 6 further receives, from the automatic feeding apparatus 3, an instruction to read the information on the feeding of the pet 1, the instruction being modulated into an electromagnetic wave. The instruction is carried by the electromagnetic wave in a modulated manner. The receiving device 6 demodulates the electromagnetic wave and outputs the instruction to the information memory device 4. The receiving device 6 can send prescribed information to the information memory device 4 in lieu of the information based on the instruction from the automatic feeding apparatus 3.

The information memory device 4 receives the instruction and outputs the information on the feeding of the pet 1 to the sending device 5.

The sending device 5 receives the information and modulates the information into an electromagnetic wave and sends the electromagnetic wave to the automatic feeding apparatus 3 through the antenna 7.

Figure 3:
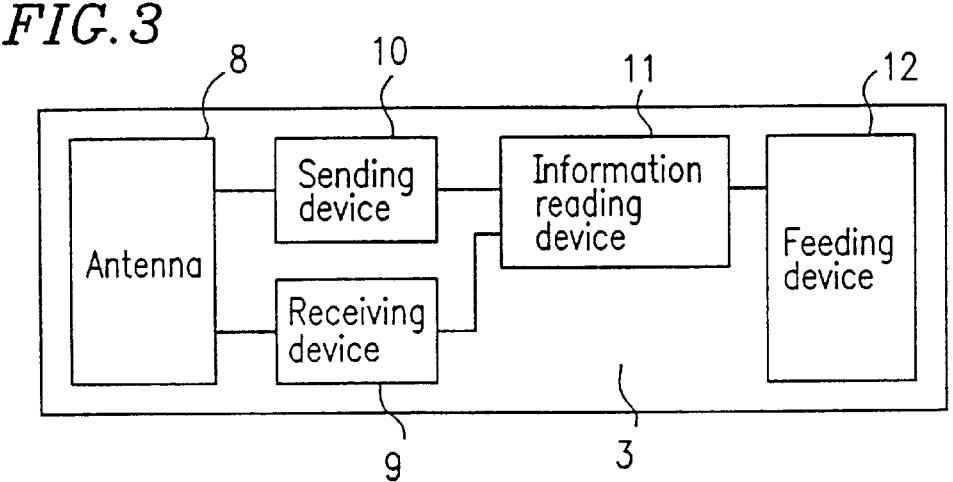
FIG. 3 is a block diagram illustrating a structure of an automatic feeding apparatus in the automatic feeding system shown in FIG. 1.

FIG. 3 is a block diagram illustrating a structure of the automatic feeding apparatus 3.

The automatic feeding apparatus 3 includes an antenna 8, a receiving device 9, a sending device 10, an information reading device 11 and a feeding device 12.

The receiving device 9 receives the electromagnetic wave sent from the tag 2 through the antenna 8 and demodulates the electromagnetic wave to obtain the information on the feeding of the pet 1. The receiving device 9 then sends the information to the information reading device 11.

The information reading device 11 receives the information from the receiving device 9 and analyzes the information. Then, the information reading device 11 determines the feeding conditions of the pet 1 based on the results of the analysis, and outputs the conditions to the feeding device 12. The conditions include the amount of the feed to be given to the pet 1 and the time to feed the pet 1. The information reading device 11 also outputs an instruction to read the information on the feeding of the pet 1 from the tag 2 to the sending device 10 at a prescribed time interval based on the time of a counter (not shown) in the automatic feeding apparatus 3 or at the time to feed the pet 1 which has already been received.

The sending device 10 receives the instruction from the information reading device 11, modulates the instruction to an electromagnetic wave, and sends the electromagnetic wave to the tag 2 through the antenna 8. The sending device 10 also sends an electromagnetic wave to supply power to the tag 2 through the antenna 8.

The feeding device 12 feeds the pet 1 based on the conditions received from the information reading device 11.

A structure for the feeding device 12 is the same as that of the conventional feeding device and will not described herein in detail.

The automatic feeding system 100 having the above-described structure operates in the following manner.

When the pet 1 is not near the feeding site, the automatic feeding apparatus 3 does not obtain information from the tag 2. The automatic feeding apparatus 3 determines whether or not the pet 1 is near the feeding site based on whether or not information is obtained from the tag 2. When the pet 1 is determined to be near the feeding site, the automatic feeding apparatus 3 supplies the feed to a feed tray at a prescribed time.

When the pet 1 is determined not to be near the feeding site, no feed is supplied by the automatic feeding apparatus 3. The automatic feeding apparatus 3 accesses the tag 2 periodically, for example, every 10 minutes, so that the feed is supplied when the pet 1 returns. Due to such a system, even when the pet 1 is not near the feeding site at the prescribed feeding time, the pet 1 need not wait for food for a long time. Accordingly, the pet 1 is prevented from going away without being fed. Needless to say, the feed is prevented from becoming rotten.

Example 2

Figure 4:
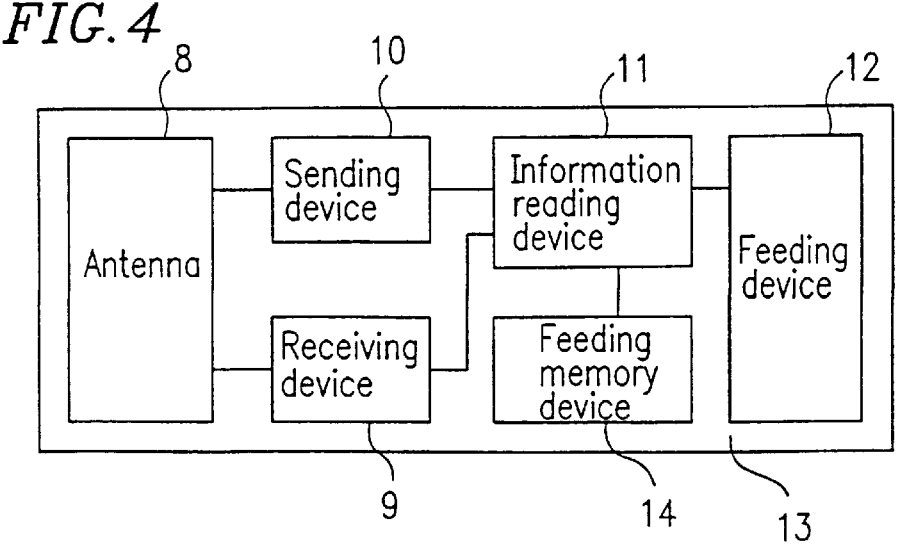
FIG. 4 is a block diagram illustrating a structure of an automatic feeding apparatus in an automatic feeding system in a second example according to the present invention.

FIG. 4 is a block diagram illustrating a structure of an automatic feeding apparatus 13 in an automatic feeding system in a second example according to the present invention. Except for the automatic feeding apparatus 13, the automatic feeding system in the second example is substantially identical with the automatic feeding system 100 in the first example.

The automatic feeding apparatus 13 includes a feeding memory device 14 in addition to the structure shown in FIG. 3. The feeding memory device 14 has a history of feeding time stored therein. The feeding time is stored based on the time of the counter (not shown) in the automatic feeding apparatus 13.

Referring to the feeding history stored in the feeding memory device 14, an optimum time to feed the pet 1 (FIG. 1) next and an optimum amount of feed are obtained. When the optimum feeding time arrives, the automatic feeding apparatus 13 accesses the tag 2 and supplies the feed after confirming the presence of the pet 1. Thus, the amount of time between feedings and the amount of feed are optimally adjusted for the pet 1, as well as preventing the food from becoming rotten.

According to the present invention, the owner of the pet need not take the pet with him or her or ask somebody else to feed the pet, when the owner is absent from home for a long time or cannot feed the pet for any other reason. Since no feed is supplied when the pet is not present near the feeding site, fresh and clean feed is given to the pet 1.

In the case where the time when the pet was fed is stored, the feeding time is recognized and the next feeding time is optimally controlled.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An automatic feeding system, comprising:
   a tag capable of being attached to a body of a pet and having:

(a) means for storing information on the feeding of the pet, (b) means responsive to instructions from an automatic feeding apparatus for reading and outputting the information on the feeding of the pet, and (c) means for transmitting the information on the feeding of the pet which is outputted from the storing means; and an automatic feeding apparatus for automatically feeding the pet and having:

(a) means for transmitting instructions to the tag to read and output the information on the feeding of the pet, (b) means for receiving from the tag the information on the feeding of the pet which is outputted from the storing means, and (c) means responsive the information on the feeding of the pet for supplying feed based on the information.

2. An automatic feeding system, comprising:

a tag capable of being attached to a body of a pet; and an automatic feeding apparatus for automatically feeding the pet, wherein:

said tag includes:

a receiving device for receiving an electromagnetic wave from the automatic feeding apparatus;

an information memory device storing information on the feeding of the pet and outputting the information in response to an output from the receiving device; and a sending device for sending the information which is output from the information memory device to the automatic feeding apparatus using an electromagnetic wave, and said automatic feeding apparatus includes:

a receiving device for receiving the electromagnetic wave from the tag;

an information reading device for reading the information on the feeding of the pet in response to an output from the receiving device of the automatic feeding apparatus;

a feeding device for supplying feed based on the information; and sending device for sending an instruction to read the information on the feeding of the pet to the tag using an electromagnetic wave.

3. An automatic feeding system according to claim 1, wherein the sending device of the automatic feeding apparatus sends the instruction to the tag periodically until the presence of the pet is confirmed.

4. An automatic feeding system according to claim 1, wherein the automatic feeding apparatus further includes a feeding memory device for storing information on a history of feeding times.

5. An automatic feeding system according to claim 1, wherein the information on the feeding of the pet includes information on an amount of feed to be given to the pet and the times to feed the pet.

6. An automatic feeding system according to claim 1, wherein the tag is attached to the pet by implantation into the body of the pet.

7. An automatic feeding system according to claim 1, wherein the tag is attached to the pet by attachment to a collar worn by the pet.

8. An automatic feeding system according to claim 1, wherein said sending device periodically sends, until the presence of the pet is confirmed, an instruction to read the information on the feeding of the pet to said tag.

9. An automatic feeding system according to claim 1, wherein said automatic feeding apparatus further includes a feeding memory device for storing the information on the feeding of the pet, including information on an amount of feed to be given to the pet and the times to feed the pet.

10. An automatic feeding system according to claim 1, wherein:

(a) said receiving device of said tag receives the electromagnetic wave from said automatic feeding apparatus independent of an orientation of said receiving device of said tag to said automatic feeding apparatus, (b) said receiving device of said automatic feeding apparatus receives the electromagnetic wave from said tag independent of an orientation of said receiving device of said automatic feeding apparatus to said tag, and (c) said sending device periodically sends, until the presence of the pet is confirmed, an instruction to read the information on the feeding of the pet to said tag, and (d) said automatic feeding apparatus further includes a feeding memory device for storing the information on the feeding of the pet, including information on an amount of feed to be given to the pet and the times to feed the pet.

11. An automatic feeding system according to claim 1, wherein said automatic feeding apparatus also includes means for changing the information on the amount of feed to be given to the pet and the times to feed the pet to an updated form so as to prevent spoilage of the feed.

12. An automatic feeding system according to claim 1, wherein said tag is adapted for attachment by implantation into the body of the pet.

13. An automatic feeding system according to claim 1, wherein said tag is adapted for attachment to a collar worn by the pet.

* * * * *

UNITED STATES PATENT AND TRADEMARK OFFICE
CERTIFICATE OF CORRECTION

PATENT NO. : 6,044,795
DATED : April 4, 2000
INVENTOR(S) : Matsuura et al.

It is certified that error appears in the above-identified patent and that said Letters Patent is hereby corrected as shown below:

Title page, item [56],
References Cited, U.S. Patent Documents, "5,332,034" should read -- 5,322,034 --.

Column 5,
Line 46, "1" should read -- 2 --.
Line 50, "1" should read -- 2 --.

Column 6,
Line 1, "1" should read -- 2 --.
Line 5, "1" should read -- 2 --.
Line 8, "1" should read -- 2 --.
Line 11, "1" should read -- 2 --.
Line 15, "1" should read -- 2 --.
Line 21, "1" should read -- 2 --.
Line 41, "1" should read -- 2 --.
Line 46, "1" should read -- 2 --.
Line 49, "1" should read -- 2 --.

Signed and Sealed this

Second Day of October, 2001

*Attest:*

Nicholas P. Godici

NICHOLAS P. GODICI
*Attesting Officer*   *Acting Director of the United States Patent and Trademark Office*